July 11, 1961 H. W. MOSER ET AL 2,991,953

MILL ROLL STAND

Filed Jan. 23, 1957 5 Sheets-Sheet 2

INVENTORS:
HENRY W. MOSER
THOMAS H. PARIS
JOHN PATERSON
BY Howson & Howson
ATTYS.

July 11, 1961 H. W. MOSER ET AL 2,991,953
MILL ROLL STAND
Filed Jan. 23, 1957 5 Sheets-Sheet 3

INVENTORS:
HENRY W. MOSER
THOMAS H. PARIS
JOHN PATERSON
BY Howson & Howson
ATTYS.

July 11, 1961 H. W. MOSER ET AL 2,991,953
MILL ROLL STAND
Filed Jan. 23, 1957 5 Sheets-Sheet 4

FIG. 7.

INVENTORS:
HENRY W. MOSER
THOMAS H. PARIS
JOHN PATERSON
BY Howson & Howson
ATTYS.

United States Patent Office 2,991,953
Patented July 11, 1961

2,991,953
MILL ROLL STAND
Henry W. Moser, Haddonfield, and Thomas H. Paris, Trenton, N.J., and John Paterson, Springfield, Pa., assignors to Samuel M. Langston Co., Camden, N.J., a corporation of New Jersey
Filed Jan. 23, 1957, Ser. No. 635,808
10 Claims. (Cl. 242—57.1)

A broad object of this invention is to provide improved apparatus for lifting, holding and aligning a heavy reel of sheet material such as paper so that it can be unwound for further processing of the said material.

A more specific object of the invention is to provide apparatus of the stated character that will perform its several functions without use of a center core shaft for the reel.

The invention also contemplates the provision of novel and improved means for maintaining adjustable uniform tension in the unwinding web and for maintaining the web in accurate alignment with the reel.

Other objects will appear from the following description.

The invention will be better understood by reference to the attached drawings wherein.

With reference to the embodiment of the invention shown in FIGS. 1 to 5 inclusive, a pair of end frames 1 and 2, shown in broken lines, provide supporting journals for a rock shaft 3. Mounted on this shaft is a pair of arms 4 and 5, the arms being attached to the shaft by way of a key 6 and being free to slide axially on the shaft. Angular displacement of the shaft about its axis will be transmitted through the said key to the arms.

Figures 1, 2, 3:
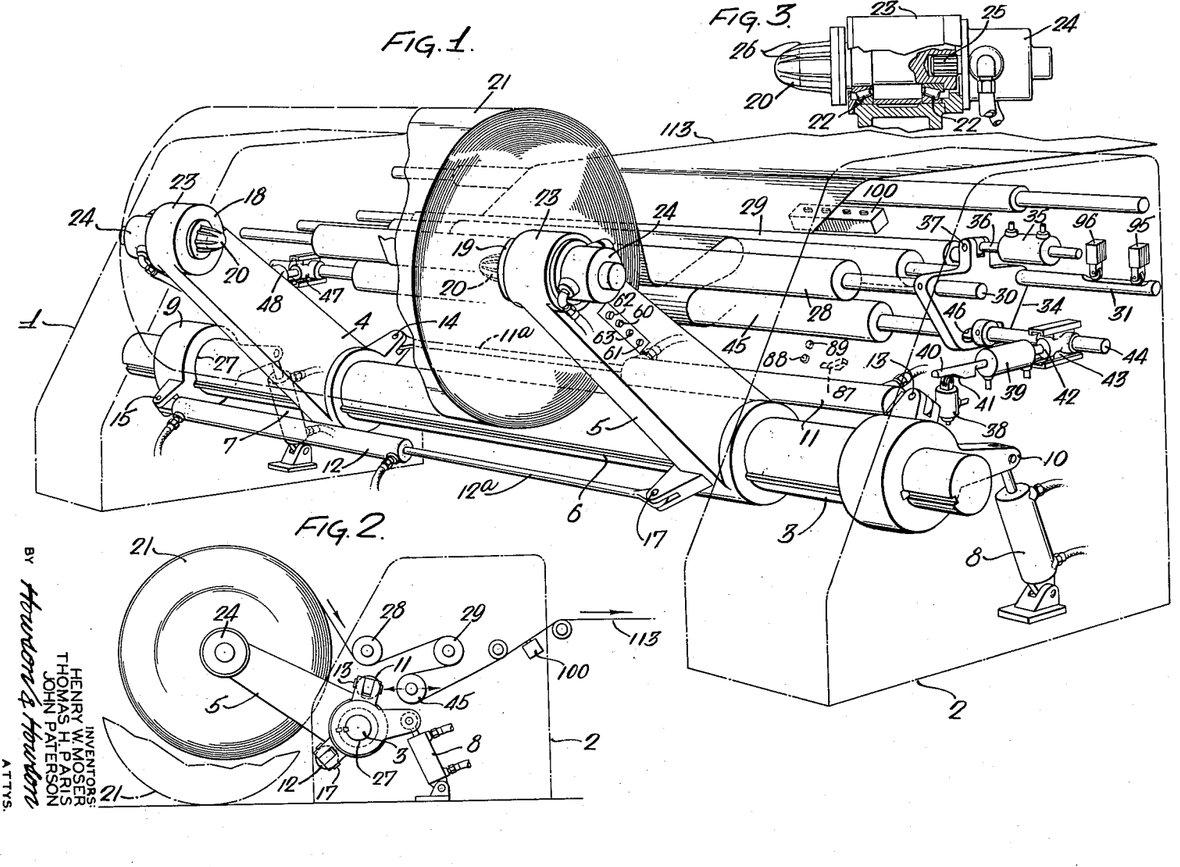
FIG. 1 is a diagrammatic view in perspective showing the essential elements of structure and control in said apparatus.
FIG. 2 is a diagrammatic side elevational view of the apparatus on a reduced scale.
FIG. 3 is a fragmentary side elevational and partial sectional view showing the details of one of the reel-supporting chucks.
Figure 4:
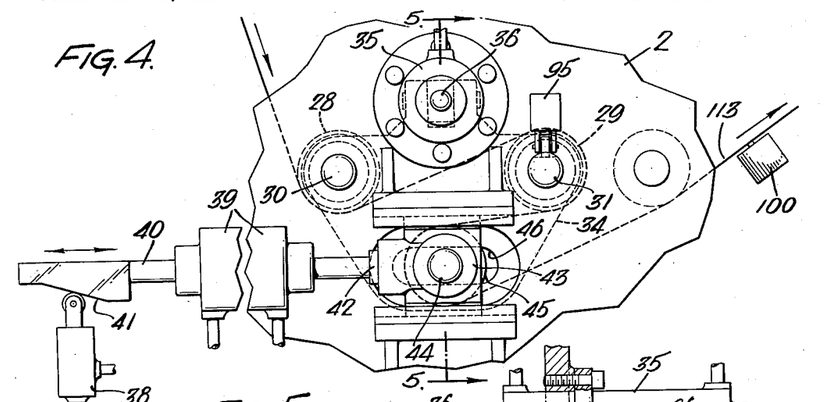
FIG. 4 is a fragmentary side elevational view from the right-hand end of the machine as shown in FIG. 1 showing details of the tensioning and aligning mechanism.
Figure 5:
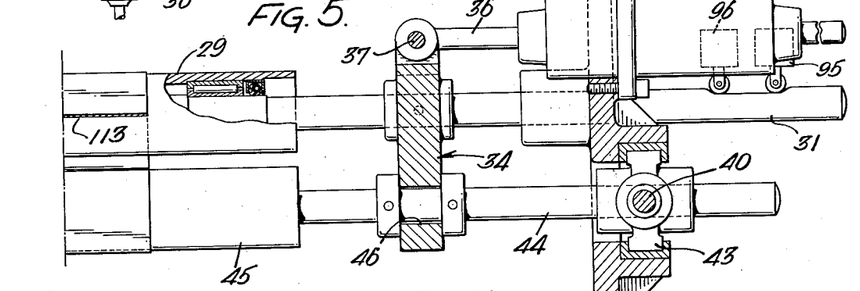
FIG. 5 is a sectional view on the line 5—5, FIG. 4.

Hydraulic cylinders 7 and 8 are located respectively at the opposite ends of the shaft for rocking the latter. The cylinders are connected to the respective ends of the shaft by levers 9 and 10 which are keyed as indicated in FIGS. 1 and 2 to the shaft. Use of the two cylinders minimizes torsional deflection of the cross shaft, each of the cylinders being capable of delivering one-half of the force required to rock the shaft. In the present instance, the cylinders 7 and 8 are mounted in the end frames 1 and 2 respectively.

The arms 4 and 5 may be moved axially on the shaft 3 by hydraulic cylinders 11 and 12. The head end of the cylinder 11 is pivotally attached at 13 to the hub portion of the lever 10, and the piston rod 11a which projects from the opposite end of the cylinder is similarly connected at 14 to the hub portion of the arm 4. The head end of cylinder 12 is similarly connected at 15 to the lever 9, and its piston rod 12a is connected at 17 to the hub portion of the arm 5. Hydraulic pressure applied to the rod ends of cylinders 11 and 12 will tend to move the rods into the cylinders and will thereby draw the arms 4 and 5 together axially on the shaft. Hydraulic power applied to the head ends of the cylinders will tend to separate the arms.

Each of the arms 4 and 5 carries in its outer end a chuck, 18 and 19 respectively. Each chuck comprises a projecting spindle 20 which is adapted to enter the core opening of a reel 21 of paper or other sheet material to mount the reel on the arms 4 and 5. The details of the chucks are illustrated in FIG. 3. The spindle 20 is journalled in antifriction bearings 22 in a cylindrical housing 23 on the outer end of the supporting arm 4 or 5 as the case may be. A hydraulic pump 24 is mounted on the outer end of the housing and the pump shaft is attached to the spindle by a splined stub 25. The projecting reel-engaging end of the spindle 20 is generally conical in shape with a rounded extremity and is provided with axial ribs 26 for more positive engagement with the wall of the reel bore.

With the foregoing arrangement, the cylinders 11 and 12 can act to draw the arms 4 and 5 together against opposite ends of a reel supported on the chucks. The ends of the rock shaft 3 are reduced in diameter to provide shoulders 27 against which the levers 9 and 10 are seated so that the axial thrusts imposed upon the shaft by action of the cylinders 11 and 12 will have no tendency to displace the shaft 3 in axial direction. Thus, when the cylinders 11 and 12 are operated simultaneously to draw the arms 4 and 5 together to grip a reel, the reactions of the cylinders are transmitted by way of the oscillating levers 9 and 10 to the shoulders 27 and thence, to the shaft. The net result is an axial compressive load on the shaft. When the arms are being moved away from each other to release the reel, the reactions of the cylinders are taken by the end frames 1 and 2 again through the levers 9 and 10. The cylinders 11 and 12 oscillate with the arms 4 and 5 thereby avoiding necessity for mechanism to compensate for relative motion between the arms and the cylinder mountings.

While the reel is being unwound constant squeeze may be maintained upon the ends of the reel by action of and by virtue of constant hydraulic pressure in the cylinders 11 and 12. This automatically compensates for any possible yield in the reel between the chucks 18 and 19. Also, the hydraulic circuit, which constitutes a feature of the invention hereinafter described, comprises means for maintaining equal movements of the arms 4 and 5 so as to maintain the axial position of the reel undisturbed.

Means is provided, also as hereinafter described, for automatically relieving the gripping force of the arms on the reel before the reel diameter diminishes to a point where its cross sectional area is inadequate to withstand the compressive force of the arms without buckling; and in the present instance, this is accomplished in response to pressure created by the weight of the reel in the hydraulic circuit of the cylinders 7 and 8. The cylinders 11 and 12 are constructed so that the cross-sectional areas of the respective piston rods 11a and 12a are equal to one-half of the cross-sectional area of the piston or cylinder bore. Thus, with equal hydraulic pressures on both sides of the piston, the effective axial force on the head end of the piston will be twice the effective force on the rod-end. Should it be necessary for proper alignment of the web to move the reel and web to the right as viewed in FIG. 1, this can be accomplished by applying pressure to the head end of the cylinder 12 and opening the head end of the cylinder 11 to discharge. When the pressure on the cylinder 12 is sufficiently great to overcome frictional resistance or inertia of the reel and of the reel-supporting arms 4 and 5, the two arms and reel will move to the right as a unit. Hydraulic fluid displaced from the rod-end of cylinder 12 will be directed to the rod-end of cylinder 11 so as to maintain a constant total volume of fluid at the rod-side of the two cylinders and consequent constant pressure of the arms 4 and 5 on the opposite ends of the reel. The reaction to the lateral adjustment force is taken by the end frame 1 or 2 away from which the movement of the reel occurs.

For automatic web alignment, we provide two scanning rolls 28 and 29. These rolls are mounted in bearings in the end frames 1 and 2. The shafts 30 and 31 of the rolls 28 and 29 are connected to a cross-head 34 which is adjustable axially of the shafts in the end frame 2. Axial adjustment of the rolls 28 and 29 may be effected through the medium of a hydraulic cylinder 35, the piston rod 36 of which is connected at 37 to the cross-head 34. Cylinder 35 is formed with double piston rod extensions to provide equal pressure areas at both ends of the piston, and this area is equal to the head area of the pistons in cylinders 11 and 12. With this construction and assuming means for causing the fluid displaced in a right-hand adjustment of the reel from the head-end of cylinder 11 to flow to the left end of cylinder 35 at constant volume, then during such axial adjustment of the reel an equal axial movement of the rolls 28 and 29 in the same direction will be obtained. Equal left motions are obtained by causing fluid from the cylinder 12 head-end to flow to the right end of cylinder 35.

An important feature of the machine resides in the improved means for applying tension to the moving web. This means is found in the hydraulic pumps 24 which are associated as previously described with the chucks 18 and 19. As the roll is unwound and the chuck spindles are rotated, the pumps are driven so as to generate hydraulic pressure. The hydraulic pumps are constant volume-per-revolution pumps and the torque required to drive them is proportional to the pressure in the discharge line. In accordance with the invention, this line pressure is controlled by a pressure relief valve the setting of which is controlled automatically by a control valve 38. This valve is operated by a hydraulic cylinder 39 having a piston with rod extensions at both ends of the cylinder. The piston rod extension 40 at one end has a cam 41 which actuates the valve 38, as illustrated, to regulate the pump discharge line pressure. The other piston rod extension is attached at 42 to a cross head 43 in which is journalled one end of the shaft 44 of a tension control idler roll 45 said shaft being free to slide in a horizontal slot 46 in the cross head 34. The web unwinding from the reel passes under roll 28, over roll 29, and then in a 180° loop around the roll 45 as indicated in FIG. 1, so that pull or tension in the web acts on the latter roll in direction parallelling the slot 46 and therefore in the direction in which the said roll is free to move. A cross head 47 similar to the cross head 43 supports the opposite end of the shaft 44 and is connected to a cylinder 48 corresponding to cylinder 39 and connected with the latter for simultaneous actuation therewith.

Pressure in the hydraulic cylinders 39 and 48 attached to the tension control idler roll 45 as described will oppose the tension pull of the web. With the 180° wrap, the tensional pull in the web will normally equal the force on the pistons of the hydraulic cylinders 39 and 48, and with these forces in equilibrium the piston rod will not move. If the tensional pull in the web is greater than the force on the piston, the pistons will be moved to the right as viewed in FIG. 1. The cam 41 will then move the control valve 38 changing the value of valve 115 so as to reduce the pressure in the discharge line of the pumps 24 and 24 thereby reducing the torque required to drive these pumps with consequent reduction in web tension. This process is reversed when the tension of the web becomes less than the force on the piston.

Figure 7:
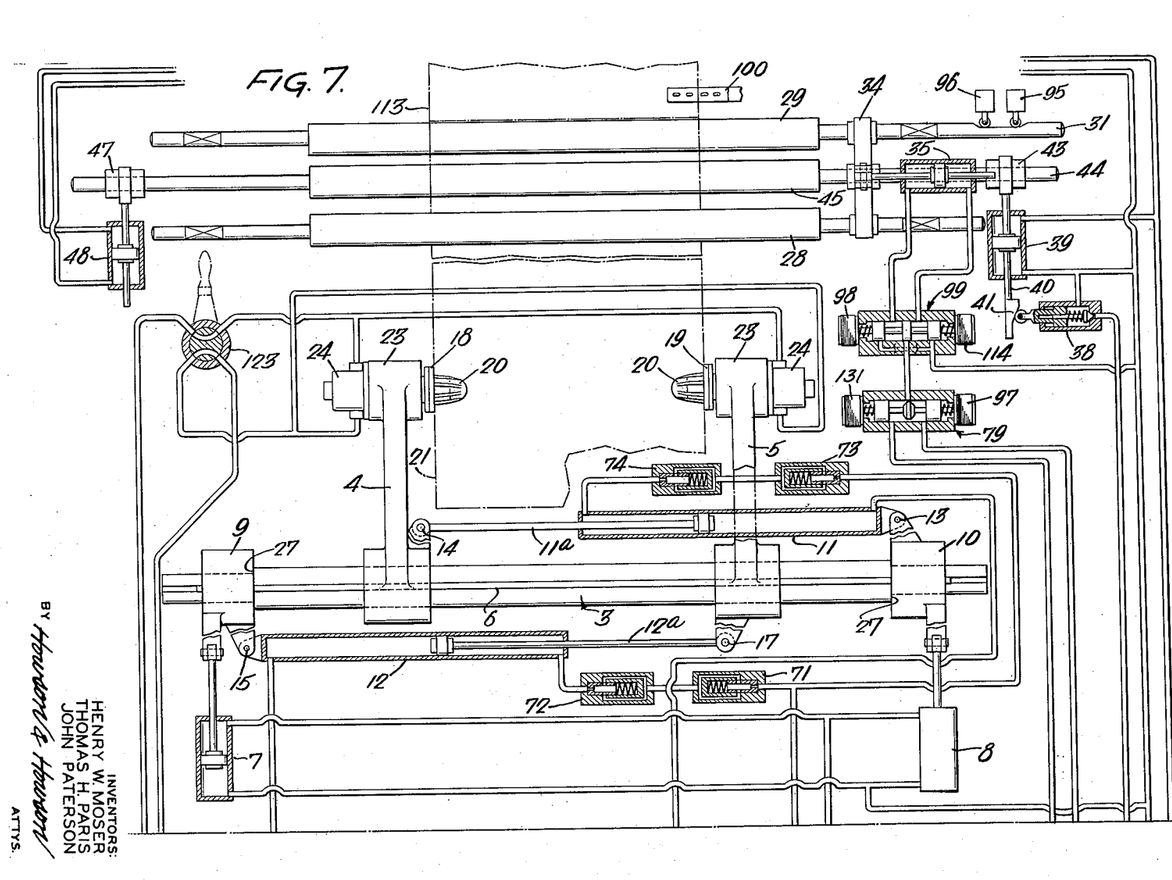
FIGS. 7 and 8 are diagrammatic views jointly illustrating details of the electrohydraulic system of the apparatus.
Figure 8:
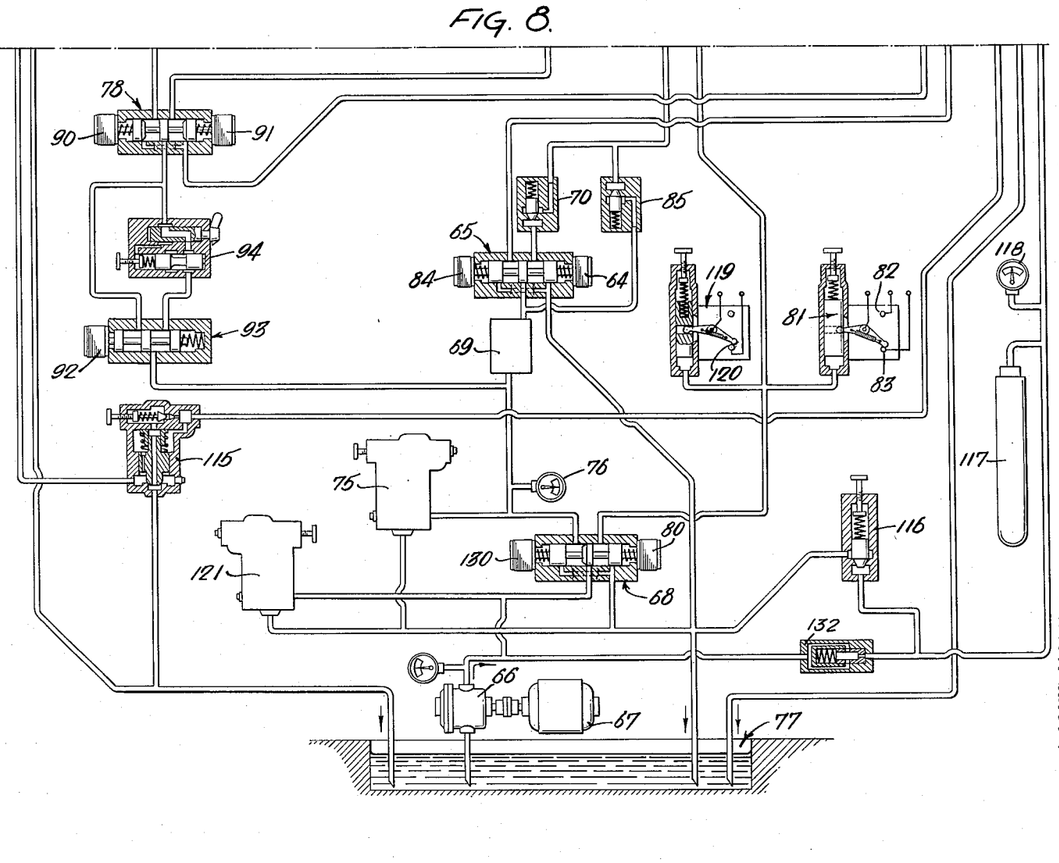

The hydraulic system for actuation and control of the afore-described apparatus is shown in FIGS. 7 and 8. Reel chuck arms 4 and 5 may be brought together along shaft 3 against opposite ends of the reel 21 by pushing button 60 on arm 5 (see FIG. 1) thereby energizing coil 64 which moves hydraulic valve 65 to the left, as viewed in FIG. 8, and opens the rod end of cylinders 11 and 12 to pressure from the pump 66 driven by motor 67. Pressure flow from the pump is by way of hydraulic valve 68, check valve 69, valve 65 referred to above, check valve 70, constant volume flow control valves 71 and 72 to cclinder 12, and constant volume flow control valves 73 and 74 to cylinder 11. This will force spindles 20 of reel chucks 18 and 19 into opposite ends of reel core. The amount of constant squeeze exerted by the reel chucks on the reel is controlled and can be regulated by control valve 75 and may be read from gauge 76. Valve 75 controls bypass from pressure line to sump 77 and in effect maintains a predetermined operative pressure in the pressure line. Constant volume flow control valves 71 and 73 maintain equal inward movements of the arms 4 and 5 toward each other along the shaft 3. Fluid from head end of cylinders 11 and 12 discharges through the valve 78 to and through valve 79 to valve 65 which, with its coil 64 energized as described, will pass the fluid through to the sump 77.

When the reel has been engaged by the reel chucks, operator presses raise button 63 on arm 5, energizing coil 80 of valve 68, shifting the valve to the left and opening the rod-end of cylinders 7 and 8 to pressure, which, through levers 9 and 10, rock shaft 3 and raise arms 4 and 5, lifting the reel from floor or cradle. When the reel has been raised to desired height, operator releases button 63 de-energizing coil 80, thereby centering valve 68 and locking the hydraulic fluid in cylinders 7 and 8. The maximum amount of lift permitted is controlled by the setting of pressure control valve 121.

The arms may be lowered by pressing button 61 on arm 5, energizing coil 130 of valve 68, opening the rod-end of cylinders 7 and 8 to the tank. Since the head ends of cylinders 7 and 8 are never connected to pressure, arms lower by gravity only, and can exert no downward force greater than their own weight plus the weight of any reel being held between them.

The pressure in the now locked hydraulic circuit of cylinders 7 and 8, supporting the weight of the reel, will trip the pressure switch 81 closing electrical contacts 82 and opening contacts 83. Coil 64 will now be constantly energized as long as the weight of the reel is sufficient to cause pressure in the lift circuit to exceed the adjustable tripping pressure of switch 81. Until the weight of the reel is diminished or reel is returned to the floor, coil 64 will hold valve 65 so that rod ends of cylinders 11 and 12 will be open to pressure, thus maintaining constant squeeze. Contact 83 is a safety measure to prevent coil 84 of valve 65 from being energized and actuating the valve to separate the arms 4 and 5 while the reel is in the air. When the pressure in the lift circuit drops below the tripping pressure of switch 81, contacts 82 and 83 will assume their normal position and will thereby de-energize coil 64 allowing valve 65 to center and locking the hydraulic squeeze circuit so as to halt any further inward movement of the arms 4 and 5.

After the reel has run out, arms 4 and 5 can be separated for re-loading by pressing open push-button 62 on arm 5, which energizes coil 84 of valve 65. This will position valve 65 so as to allow fluid to pass to valve 79, which in normal position directs the pressure fluid to valve 78 and thence to the head end of cylinders 11 and 12. The arms are then forced away from each other and their movements will be equal since the fluid discharging from the rods ends of cylinders 11 and 12 will pass through constant volume flow control valves 74 and 72. Check valve 70 causes discharge fluid to flow through check valve 85. Since the effective areas of the head ends of cylinders 11 and 12 are twice the effective areas of the rod ends, the pressure of the discharging fluid from the rod end, if confined, can be twice the pressure on the head end. When this pressure is greater than line pressure, the fluid will pass through check valve 85 into the line to the head ends of cylinders 11 and 12.

The hook-up so arranged accomplishes two objectives. First it makes available an increased volume of fluid under pressure to move the arms, resulting in equal outward and inward arm velocities with the same pump capacity, in spite of the fact that the head ends of cylinders 11 and 12 require twice the volume of fluid as the rod ends. Secondly, since the maximum line pressure for separating the arms is the same as the maximum line pressure for drawing the arms together, the arms separating force will equal the arm closing force in spite of double effective piston areas.

Manual lateral adjustment of the reel is accomplished by setting a selector switch 87 (hereinafter described) on manual and by pressing right or left push-button 88 or 89 (on frame 2, see FIG. 1) thus energizing coil 90 or 91 of valve 78 and coil 92 of valve 93. Coil 92 will shift valve 93 allowing fluid to bypass valve 94 to valve 78. With right button 88 pressed, coil 90 will shift valve 78 allowing fluid to pass to head end of cylinder 12, whose rod will move arm 5 to the right. Check valve 69 will not allow fluid in rod ends of cylinders 11 and 12 to pass and consequently fluid displaced in the rod-end of cylinder 11 will flow to the rod-end of cylinder 12 maintaining constant total volume in the said rod ends and precluding change in the squeeze of the arms on the reel. The fluid in the head of the cylinder 11 will flow through valve 78 to and through valve 79 to valve 65 whose position with coil 64 energized will allow it to flow to the sump. The arms, with the reel chucked between them, will move to the right as a unit with no change in the squeeze force on the reel. Manual motion to the left is performed in the same manner with valve 78 shifted in the opposite direction by coil 91 energized through left push-button 89.

At the completion of a reel, should cylinder 35 be off-center, limit switch 95 or 96 will be tripped by camming action of shaft 31, see FIG. 1. Off-center to the left will trip limit switch 95, closing normally open contacts and opening normally closed. Thus, when open button 62 is pushed, coils 84, 97, and 98 will be energized, shifting their respective valves 65, 79 and 99 so as to cause fluid to pass through these valves to left side of cylinder 35. When cylinder 35 is centered, limit switch 95 will be released, de-energizing coils 97 and 98, centering valves 79 and 99 causing fluid to flow to cylinders 11 and 12 separating arms as previously described. Thus, scanning rolls 28 and 29 are automatically re-centered prior to the loading of a new reel.

Figure 6:
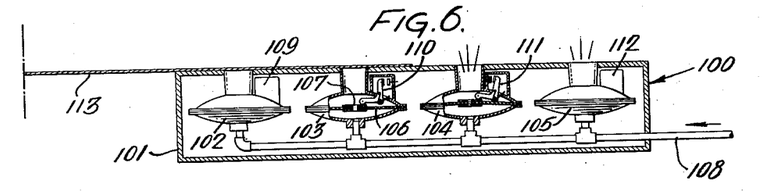
FIG. 6 is a vertical sectional view of the sensing head constituting an element of the web-aligning mechanism.

Automatic lateral adjustment of the reel utilizes, in the present instance, an air-escape sensing head 100, shown in FIG. 1 and in greater detail in FIG. 6. This head, a commercially available article, consists of a housing 101 having four holes in longitudinal series in the top. These holes provide, respectively, outlets for a corresponding series of pneumatically-actuated switch units 102, 103, 104, and 105 mounted in the housing, each unit consisting of a casing having an interior diaphragm 106 which, except for an orifice 107 therein, divides the interior of the casing into upper and lower chambers. The upper chamber of each unit communicates with the proximate hole of the aforesaid series at the top of the housing; and the lower chamber of all of the units are connected to a pressure-air supply pipe 108. Each unit comprises also an electric switch, 109, 110, 111 and 112 respectively, which is operatively connected to the diaphragm. With the diaphragms of the units 102 and 103 normally depressed, the switches 109 and 110 are open, as illustrated; and when the diaphragms are flexed upwardly, these switches are closed. Reversely, in units 104 and 105, the switches 111 and 112 are closed when the diaphragms are normally depressed and are open when the diaphragms are extended upwardly as shown.

The housing is mounted as shown in FIGS. 1 and 6 so that two of the holes at one end are normally covered by the unwinding web 113, the other two holes being normally unobstructed. There being little or no flow of air in the covered units 102 and 103, the diaphragms will occupy the normally depressed position and the associated switches 109 and 110 will be open. The switches 111 and 112 will also be open because the pressure of air from the pipe 108 will be greater in the lower chambers of the units 104 and 105 than in the upper chambers wherein the pressure air entering through the diaphragm orifice 107 is immediately dissipated through the unobstructed discharge opening.

If the edge of the web should move to the right as viewed in the drawings so as to cover the air hole of unit 104, air will not be able to pass from the unit and a uniform pressure will be built up in its two chambers, permitting the diaphragm to return to the normal depressed position and closing the switch 111. Further movement of the web to the right will cover the hole of unit 105 and in the same manner will close switch 112. If the web should move to the left uncovering the hole of unit 103 there will be a pressure drop in the upper chamber extending the diaphragm and closing switch 110. Further, web run-out to the left will uncover the hole of unit 102 and in the same manner close switch 109. These switches are used to energize the solenoids of the hydraulic valves which control the position of the reel and web laterally in the machine. No claim is made to this method of sensing and it is obvious that other sensing devices such as photoelectric cells might be used for the same purpose.

With the previously noted selector switch 87 set on automatic, coil 131 will be continuously energized, permitting flow of fluid from valve 79 to valve 99. In its normal position, valve 93 connects line pressure to flow regulator valve 94 and cuts off its bypass to valve 78. If the edge of the web moves to the left causing switch 110 to be closed, solenoids 90 and 98 will be energized shifting valves 78 and 99 and allowing fluids to pass to head end of cylinder 12. This will result in lateral movement of the sheet material reel and of scanning rolls 28 and 29 to the right as previously described in connection with manual lateral adjustment, but with the two following distinctions. First, since valve 93 is in its normal position, fluid must pass through flow regulator valve 94 at a pre-set velocity. Thus, the velocity of lateral movement will be slow, and can be adjusted through flow control valve 94. Secondly, with coils 90, 98 and 131 energized, fluid discharging from head side of cylinder 11 instead of flowing through valves 78, 79 and 65 respectively to the sump will now flow through valves 78, 79 and 99 to left side of cylinder 35 whose working area is equal to the area of head side of cylinders 11 and 12. With these areas equal, the displaced volume of fluid flowing from head end of cylinder 11 to left side of cylinder 35 will cause the movement of the piston of cylinder 35 to be equal to the movements of the pistons of cylinders 11 and 12. Should the edge of the web be over to the left far enough to cause switch 109 to also close, coil 92 will be energized allowing fluid to bypass valve 94 to cylinder 12 at a higher velocity, resulting in right lateral adjustment of reel and scanning rolls 28 and 29 at the same higher velocity produced by pressing push-button 88. The two velocities are desirable to prevent overtravel. If the web is a small increment out of location, its correction rate will be slow. If the web is out a larger amount, its correction rate will be fast until it approaches the correct position, then continue at the slower rate. Automatic lateral adjustment to the left is similar, the web will cause switch 111 and possibly 112 to close, energizing coils 91 and 114 and possibly 92.

In the constant tension hydraulic circuit, hydraulic pumps 24, 24 are driven by the unwinding reel by way of chuck cone spindles 20. The hydraulic pressure generated by the pumps 24 must flow through pilot operated pressure relief valve 115. The setting or pressure at which valve 115 opens is automatically controlled by control valve 38. The pressure in the idler roll side of hydraulic cylinders 39 and 48 will equal the web pull or tension. Adjustable pressure relief valve 116 will determine the pressure in cylinders 39 and 48. Pneumatically pre-loaded accumulator 117 supplies sufficient fluid under pressure, pre-set from relief valve 116, to cause the movements of tension control idler roll cylinders 39 and 48 to be smooth. When the web pull force on reel 21 and the force on pistons of cylinders 39 and 48 are equal, the piston rod will not move. If the web pull is greater, the movement of the rods of cylinders 39, 48 will move stem of valve 38, by means of cam 41, which will lower the relief pressure valve 115, thus reducing the discharge pressure of pumps 24, and correspondingly reducing their braking torque on the web roll. Conversely, reduction in web pull will cause idler roll 45 and cam 41 to shift stem of valve 38 in the reverse direction causing an increase in relief pressure of valve 115 which will increase the brake torque. Thus desired web tension can be pre-selected by adjusting relief pressure of valve 116, this pressure may be read on gauge 118 calibrated in total pounds web tension. A further constant flow control valve 132 is used in conjunction with this control.

Pressure switch 119 is set to open normally closed contacts 120 at a pressure higher than the pressure setting of control valve 121. Should an out of round reel be in process, at a critical speed severe enough to bounce as it rotates, endangering the lives of operators, the reel bouncing will cause fluctuations in the pressure of the locked hydraulic circuit of lift cylinders 7 and 8. The function of pressure switch 119 is to open contacts 120, when this bouncing becomes dangerous, thus stopping the drive motor pulling the web.

A complementary electrical system for control of the operations both manual and automatic described above is shown in the diagrammatic view of FIG. 11. In this diagram the elements of mechanism shown in the other figures of the drawings are identified by the same respective reference numerals. The diagram shows the manual control of the lifting and lowering of the reel through the medium, respectively, of the switches 63 and 61 (shown in FIG. 1 on arm 5) and the energization of the coils 80 and 121 of valve 68 which they individually control and which valve in turn controls the flow and discharge of pressure fluid to and from the cylinders 7 and 8.

Figure 11:
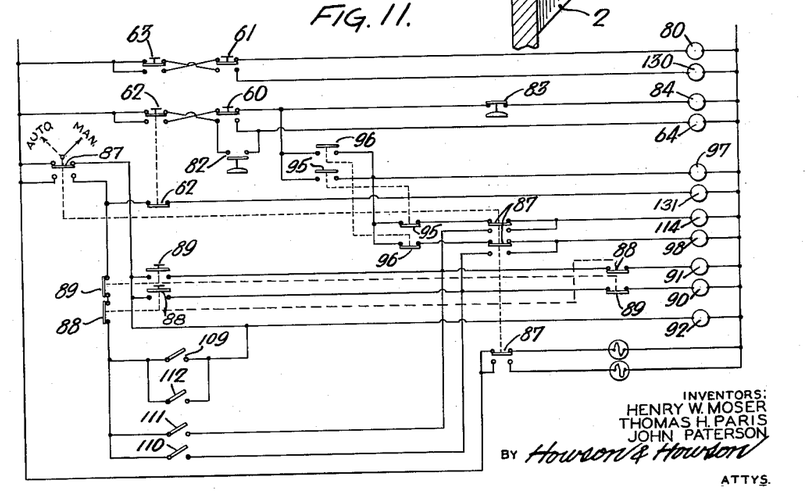
FIG. 11 is a diagram showing the electrical control system which coordinates the elements of the hydraulic system shown in FIGS. 7 and 8.

The diagram shows also the manual control through switches 62 and 60 of the coils 84 and 64 of valve 65, and also the arrangement in the circuit of the electrical contacts 82 and 83 of pressure responsive switch unit 81 which automatically prevents further compressive movement of the arms 4 and 5 on the reel when the latter has been unwound to a predetermined extent.

The system includes also the circuit for manual and automatic (selective through switch 87) lateral adjustments of the reel. Manual adjustments, right and left, are effected respectively by switch 87, and push-buttons 88 and 89 which control the coils 90 and 91 of valve 78 and coil 92 of valve 93. Automatic operation is by way of selector switch 87, coil 131 of valve 79, which is continuously energized when switch 87 is on automatic, coils 90 and 91 of valve 78, coil 92 of valve 93, coils 98 and 114 of valve 99, which valves control flow of pressure fluid to cylinder 35, and pressure responsive scanning switches 109, 110, 111 and 112.

Figure 9:
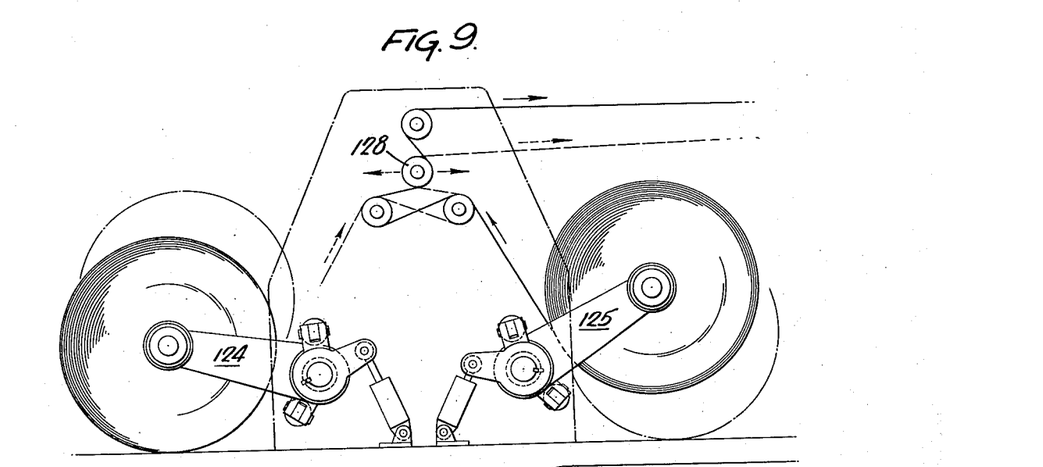
FIG. 9 is a side elevational view illustrating a modification within the scope of the invention.
Figure 10:
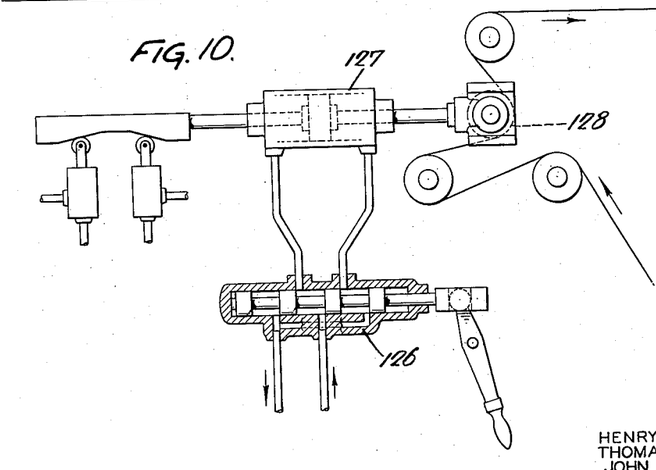
FIG. 10 is a diagrammatic view showing details of the modification illustrated in FIG. 9.

As illustrated in FIG. 7 a four-way valve 123 may be provided for reversing the discharge and intake ports of pumps 24, 24 in event that the web is unwound from underneath the reel instead of from the top as in the illustrated embodiment, the effect of such underfeed being to reverse the rotation of the reel. By reference to FIGS. 9 and 10 it will be noted that the invention contemplates also a duplex machine containing two sets of arms 124 and 125 respectively capable of holding two reels, one on each side of the frame, so that one reel may be mounted while another is unwinding. This embodiment of the invention includes also a valve 126 for directing the flow of pressure fluid selectively to the opposite ends of the cylinder 127 connected to the tension sensing roll 128 about which the webs of the mill rolls carried respectively by the two sets of arms 124 and 125 are individually passed.

We claim:

1. A mill roll stand comprising a rock shaft, a pair of arms on said shaft having means for rotatably supporting a reel of sheet material therebetween for unwinding of the material from the reel, fluid pressure means for moving the arms axially on the shaft and toward each other to grip the opposite ends of a reel placed therebetween, means operatively associated with said pressure means for exerting a predetermined pressure on the arms to force them against the reel continuously while the material is unwinding, and means responsive to a predetermined decrease of weight in the reel due to unwinding of the component material for immobilizing the arms against axial movement by said force.

2. A mill roll stand comprising a shaft, a pair of arms keyed to the shaft and movable axially thereon, means on the arms for rotatably supporting therebetween a reel of web material, a scanning roll located in the path of and for contact by the web unwinding from the reel, and operatively interassociated axial adjustment means for said arms and said scanning roll operable for simultaneously axially adjusting the arms and said roll in straight line movement and in equal amounts.

3. A mill roll stand according to claim 2 including means responsive to lateral displacement of the web from said path operatively associated with said arms and said scanning roll for automatically adjusting the said arms and roll axially in direction reverse to said displacement.

4. A mill roll stand according to claim 3, means for varying the speed of said adjustment, and means responsive to the extent of web displacement for actuating the said speed varying means to adjust the speed in direct ratio to the extent of displacement.

5. A mill roll stand comprising a pair of arms having means for rotatably supporting a reel of web material therebetween, fluid pressure power means for moving the arms together to forcibly engage the opposite ends respectively of the reel and to exert continuing clamping pressure against said ends while the material is being withdrawn from the reel, and means for automatically preventing further movement of the arms toward each other by said power means when a predetermined amount of the sheet material has been so withdrawn.

6. A mill roll stand comprising a pair of roll gripping elements for engagement respectively with the ends of the roll, means for guiding the elements for relative movements in different directions to grip and release the roll respectively, and jointly in the same direction to move the roll axially, a pair of cylinder and piston units connected respectively to said elements and constituting the sole means for axially moving the elements and associated roll, a source of fluid pressure connected with the cylinders, means for controlling the flow of pressure fluid from said source, each said unit comprising a piston rod attached to the piston and extending through one end of the cylinder, said rod reducing the effective area of the proximate side of the piston avaliable for application of the said pressure over the area of the remote side, and means operative when pressure fluid is directed to the said remote sides of the pistons for diverting the fluid discharged from the rod sides of the cylinders to the said remote sides to thereby increase the volume of fluid passing to the latter.

7. A mill roll stand according to claim 6 including guide means for a web unwinding from the roll, and means responsive to changes in the lateral position of said web for actuating the said control means to effect a joint movement of the arms and resultant axial adjustment of the roll.

8. A mill roll stand comprising a pair of roll gripping elements for engagement respectively with the opposite ends of the roll to rotatably support the latter, guide means for said elements, means for moving the elements on said guide means into engagement with the ends of a roll and for maintaining a constant axial squeeze on the roll through said elements while the roll is being unwound. and means responsive to a predetermined reduction in ratio of roll diameter to roll length for relieving said squeeze.

9. A mill roll stand according to claim 8 including gauge means for indicating the magnitude of said squeeze, and means for regulating said magnitude.

10. A mill roll stand comprising mechanism for rotatably supporting a roll, guide means for a web of material unwinding from the roll, said guide means including web engaging elements adjustable axially of the roll for aligning the web with the latter, and means operative automatically when the reel has been exhausted for readjusting the said elements to a predetermined normal position.

References Cited in the file of this patent

UNITED STATES PATENTS

| | | |
|---|---|---|
| 1,836,084 | Parker | Dec. 15, 1931 |
| 1,880,362 | Smith | Oct. 4, 1932 |
| 2,405,637 | Behrens | Aug. 13, 1946 |
| 2,464,932 | Jones | Mar. 22, 1949 |
| 2,499,562 | Behrens | Mar. 7, 1950 |
| 2,624,522 | Van Hook | Jan. 6, 1953 |
| 2,641,416 | McCleary et al. | June 9, 1953 |
| 2,663,512 | Erhardt | Dec. 22, 1953 |
| 2,666,598 | Robinette | Jan. 19, 1954 |
| 2,735,630 | Ziebolz | Feb. 21, 1956 |
| 2,738,935 | Greene | Mar. 20, 1956 |

UNITED STATES PATENT OFFICE
CERTIFICATE OF CORRECTION

Patent No. 2,991,953                          July 11, 1961

Henry W. Moser et al.

It is hereby certified that error appears in the above numbered patent requiring correction and that the said Letters Patent should read as corrected below.

Column 4, line 6, for "brough" read -- brought --; line 15, for "cclinder" read -- cylinder --; line 75, for "rods" read -- rod --; column 7, line 35, after "constant" insert -- volume --.

Signed and sealed this 13th day of February 1962.

(SEAL)
Attest:

ERNEST W. SWIDER
Attesting Officer

DAVID L. LADD
Commissioner of Patents